(12) United States Patent
Yoo et al.

(10) Patent No.: US 9,436,229 B2
(45) Date of Patent: Sep. 6, 2016

(54) FOLDABLE COMPUTING APPARATUS AND METHOD OF ERECTING DISPLAY UNIT

(71) Applicant: SAMSUNG Electronics Co., Ltd., Suwon-si, Gyeonggi-do (KR)

(72) Inventors: Byung-wook Yoo, Suwon-si (KR); Tae-wan Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 312 days.

(21) Appl. No.: 14/063,076

(22) Filed: Oct. 25, 2013

(65) Prior Publication Data

US 2014/0160654 A1  Jun. 12, 2014

(30) Foreign Application Priority Data

Dec. 11, 2012  (KR) .......................... 10-2012-0143714

(51) Int. Cl.
*G06F 1/16* (2006.01)

(52) U.S. Cl.
CPC ........... *G06F 1/1679* (2013.01); *G06F 1/1618* (2013.01); *G06F 1/1637* (2013.01); *G06F 1/1667* (2013.01); *G06F 1/1681* (2013.01)

(58) Field of Classification Search
CPC .... G06F 1/166; G06F 1/1616; G06F 1/1649; G06F 1/1679; G06F 1/1681
USPC .................................. 361/679.27; 455/575.3
See application file for complete search history.

(56) References Cited

U.S. PATENT DOCUMENTS

| | | | | |
|---|---|---|---|---|
| 6,341,061 B1* | 1/2002 | Eisbach | ............... | G06F 1/1616 312/223.2 |
| 6,430,038 B1* | 8/2002 | Helot | .................... | G06F 1/1616 248/917 |
| 6,480,373 B1* | 11/2002 | Landry | ................. | G06F 1/1616 16/308 |
| 6,593,859 B1* | 7/2003 | Watanabe | ............. | G06F 1/1616 341/20 |
| 7,061,472 B1* | 6/2006 | Schweizer | .............. | G06F 1/162 345/156 |
| 7,136,282 B1* | 11/2006 | Rebeske | ............... | G06F 1/1616 345/1.1 |
| 7,352,565 B2* | 4/2008 | Yin | ....................... | G06F 1/1616 248/917 |
| 7,511,950 B1* | 3/2009 | Brekke | ................. | G06F 1/1616 248/917 |
| 7,667,959 B2* | 2/2010 | Pelkonen | .............. | G06F 1/1616 248/923 |
| 7,787,914 B2* | 8/2010 | Ahn | ...................... | H04M 1/022 455/575.1 |

(Continued)

FOREIGN PATENT DOCUMENTS

JP      11212665      8/1999
JP    2005071297      3/2005

*Primary Examiner* — Adrian S Wilson
(74) *Attorney, Agent, or Firm* — Staas & Halsey LLP

(57) ABSTRACT

A foldable computing apparatus includes a display unit having a touch screen, a first body rotatably disposed in an end of the display unit, and a second body rotatably disposed in an end of the first body opposite to the display unit, the second body having a keyboard. The first body is rotated so that a rear surface of the display unit and a rear surface of the first body are close to each other, and then the second body is rotated with respect to the first body so as to support the display unit.

19 Claims, 14 Drawing Sheets

(56) References Cited

U.S. PATENT DOCUMENTS

| | | | | |
|---|---|---|---|---|
| 7,828,260 B2* | 11/2010 | Hauser | | A47B 23/043 248/447 |
| 7,864,524 B2* | 1/2011 | Ladouceur | | G06F 1/1616 361/679.55 |
| 8,035,963 B2* | 10/2011 | Ladouceur | | G06F 1/1616 361/679.55 |
| 8,203,832 B2* | 6/2012 | Szabolcsi | | G06F 1/1616 248/917 |
| 8,223,489 B2* | 7/2012 | Shih | | E05C 19/16 361/679.55 |
| 8,310,823 B2* | 11/2012 | Stoltz | | G06F 1/1616 361/679.08 |
| 8,421,824 B2* | 4/2013 | Brown | | G06F 3/04895 345/1.1 |
| 8,467,184 B2* | 6/2013 | Chen | | G06F 1/162 361/679.55 |
| 8,624,844 B2* | 1/2014 | Behar | | G06F 1/162 345/168 |
| 8,649,166 B2* | 2/2014 | Wu | | G06F 1/1601 361/679.27 |
| 8,773,849 B2* | 7/2014 | Bohn | | H04M 1/022 361/679.27 |
| 8,803,816 B2* | 8/2014 | Kilpatrick, II | | G06F 1/1616 345/173 |
| 8,964,381 B2* | 2/2015 | Mai | | G06F 1/1679 361/679.06 |
| 9,134,808 B2* | 9/2015 | Siddiqui | | G06F 1/1618 |
| 2002/0141146 A1* | 10/2002 | Mustoe | | G06F 1/1616 361/679.04 |
| 2003/0142469 A1* | 7/2003 | Ponx | | G06F 1/1616 361/679.04 |
| 2003/0142474 A1* | 7/2003 | Karidis | | G06F 1/1681 361/679.06 |
| 2004/0051679 A1* | 3/2004 | Ponx | | G06F 1/1616 345/1.1 |
| 2004/0114319 A1* | 6/2004 | Hill | | G06F 1/1601 361/679.28 |
| 2004/0160736 A1* | 8/2004 | Lin | | G06F 1/1649 361/679.04 |
| 2004/0246665 A1* | 12/2004 | Cheng | | G06F 1/1616 361/679.06 |
| 2004/0259593 A1* | 12/2004 | Wang | | G06F 1/1616 455/556.1 |
| 2005/0052831 A1* | 3/2005 | Chen | | G06F 1/1616 361/679.11 |
| 2005/0083644 A1* | 4/2005 | Song | | G06F 1/162 361/679.06 |
| 2006/0145046 A1* | 7/2006 | Liou | | A47G 1/143 248/455 |
| 2006/0264243 A1* | 11/2006 | Aarras | | G06F 1/1618 455/566 |
| 2006/0274490 A1* | 12/2006 | Cheng | | G06F 1/1681 361/679.07 |
| 2007/0103859 A1* | 5/2007 | Yu | | G06F 1/1616 361/679.55 |
| 2007/0121303 A1* | 5/2007 | Wang | | H04M 1/0222 361/752 |
| 2007/0217131 A1* | 9/2007 | Kehr | | G06F 1/162 361/679.27 |
| 2008/0074831 A1* | 3/2008 | Lee | | G06F 1/181 361/679.55 |
| 2008/0134467 A1* | 6/2008 | Cheng | | E05D 11/081 16/320 |
| 2008/0232054 A1* | 9/2008 | Chen | | G06F 1/1616 361/679.07 |
| 2009/0086424 A1* | 4/2009 | Jette | | G06F 1/1601 361/679.55 |
| 2009/0190295 A1* | 7/2009 | Chin | | G06F 1/1618 361/679.27 |
| 2010/0053876 A1* | 3/2010 | Widmer | | G06F 1/1616 361/679.27 |
| 2010/0064536 A1* | 3/2010 | Caskey | | G06F 1/1616 33/303 |
| 2013/0031289 A1* | 1/2013 | Yeh | | G06F 1/1632 710/303 |
| 2013/0242490 A1* | 9/2013 | Ku | | G06F 1/1628 361/679.3 |

* cited by examiner

FOLDABLE COMPUTING APPARATUS AND METHOD OF ERECTING DISPLAY UNIT

CROSS-REFERENCE TO RELATED APPLICATIONS

This application claims the benefit under 35 U.S.C. §119(a) from Korean Patent Application No. 10-2012-0143714, filed Dec. 11, 2012, in the Korean Intellectual Property Office, the disclosures of which are incorporated herein by reference in their entirety.

BACKGROUND OF THE INVENTION

1. Field of the Invention

The present disclosure relates to a foldable computing apparatus that has a touch screen and is formed such that a main body and a display unit can be folded with respect to each other. More particularly, the present disclosure relates to a foldable computing apparatus that can erect and support a display unit by using a main body formed to be folded, and a method of erecting the display unit of the foldable computing apparatus.

2. Description of the Related Art

Generally, a notebook computer includes a main body formed with a keyboard and a display unit formed with a screen. The main body and the display unit are connected by hinges. Accordingly, when using the notebook computer, a user rotates the display unit with respect to the main body so as to expose the screen and the keyboard, uses the keyboard to input data, and moves a cursor displayed on the screen by using a touch pad or mouse thereof.

Recently, as tablet computers using a touch screen come into fashion, notebook computers with a display unit to which a touch screen is applied instead of a general screen are being released. The notebook computer with the touch screen can be operated by touching the touch screen as well as the keyboard. Accordingly, since the notebook computer with the touch screen can perform functions of a conventional notebook computer and a tablet computer, it is convenient to use.

However, conventional notebook computers with the touch screen have a structure in which a hinge unit disposed between the display unit and the main body supports the touch screen. Accordingly, when a user touches the touch screen with his or her hand, a force applied to the display unit is supported by the hinge unit, and the hinge unit has a structure in which, when a predetermined force is applied, the hinge unit is rotated. Accordingly, the display unit may be pushed back by the force by which the user touches the touch screen with his or her hand. Therefore, there is a problem that the conventional notebook computer with the touch screen cannot stably support the force by which the user presses the touch screen with the hand.

Accordingly, the notebook computer with the touch screen needs to have a structure that can stably support the force applied when the touch screen is touched.

SUMMARY OF THE INVENTION

The present disclosure provides a structure that can stably support a display unit when a force is applied to touch a touch screen in a foldable computing apparatus of a clam shell structure with a touch screen and a method of erecting the display unit.

Additional features and utilities of the present general inventive concept will be set forth in part in the description which follows and, in part, will be obvious from the description, or may be learned by practice of the general inventive concept.

The foregoing and/or other features and utilities of the present general inventive concept can substantially be achieved by providing a foldable computing apparatus, which may include a display unit having a touch screen, a first body rotatably disposed in an end of the display unit, and a second body rotatably disposed in an end of the first body opposite to the display unit, the second body having a keyboard, wherein the first body is rotated so that a rear surface of the display unit and a rear surface of the first body are close to each other, and then the second body is rotated with respect to the first body so as to support the display unit.

The foldable computing apparatus may include at least one first anti-slip member disposed in the other end of the first body close to the display unit.

The foldable computing apparatus may include at least one second anti-slip member disposed in an end of the second body that is opposite to the first body and will be in contact with a ground.

The foldable computing apparatus may include at least one second anti-slip member disposed in an end of the second body that is opposite to the first body and will be in contact with a ground.

The foldable computing apparatus may include at least one cushion member disposed in the other end of the second body close to the first body.

The cushion member may include a housing formed of a rubber; and a spring disposed inside the housing.

The cushion member may include a magnet disposed above the spring inside the housing, and a magnetic material to which the magnet is attracted may be disposed in the rear surface of the display unit.

The foldable computing apparatus may include a first hinge unit disposed between the display unit and the first body; and a second hinge unit disposed between the first body and the second body.

The first hinge unit may allow the first body to be rotated 360 degrees with respect to the display unit; and the second hinge unit may allow the second body to be rotated 180 degrees with respect to the first body.

The foldable computing apparatus may include a cushion device disposed in an end of the second body that is opposite to the first body and will be in contact with a ground.

At least one second anti-slip member may be disposed in the cushion device.

The cushion device may include a plurality of elastic members disposed in the end of the second body; and a cushion plate supported by the plurality of elastic members.

The first body may include a main board.

The second body may include a touch pad and at least one USB port.

The foregoing and/or other features and utilities of the present general inventive concept a method of erecting a display unit of a foldable computing apparatus that comprises the display unit, a first body, and a second body, wherein the method of erecting a display unit may include rotating the first body with respect to the display unit so that a rear surface of the first body is close to a rear surface of the display unit on which a touch screen is not disposed, rotating the second body with respect to the first body so that an end of the second body is close to the rear surface of the display unit, and putting an exposed end of the first body and the other end of the second body on a ground.

At least one cushion member may be disposed in the end of the second body close to the first body, and an end of the cushion member may be headed toward the rear surface of the display unit regardless of rotation angle of the second body with respect to the first body.

When the first body is rotated with respect to the display unit, at least one first anti-slip member disposed in an end of the first body close to the display unit may be exposed.

The foregoing and/or other features and utilities of the present general inventive concept may also be achieved by providing a foldable computing apparatus including a display unit having a touch screen, a first body having a first end to be coupled to the display unit and to be rotatable with respect to the display unit in a range of a first maximum angle, and a second body rotatably coupled to a second end of the first body opposite to the display unit and to be rotatable with respect to the first body in a range of a second maximum angle smaller than the first maximum angle, the second body having a keyboard.

The foldable computing apparatus may further include a first hinge unit having a first shaft connected to the display unit and a second shaft connected to the first body, and a second hinge unit having a single shaft connected between the first body and the second body.

The foldable computing apparatus may further include a cushion member movably disposed on the second body to contact a rear surface of the display unit opposite to the touch screen in a touch mode.

The foldable computing apparatus may further include an anti-slip member disposed on at least one of the first body and the second body to contact a reference surface in a touch mode.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
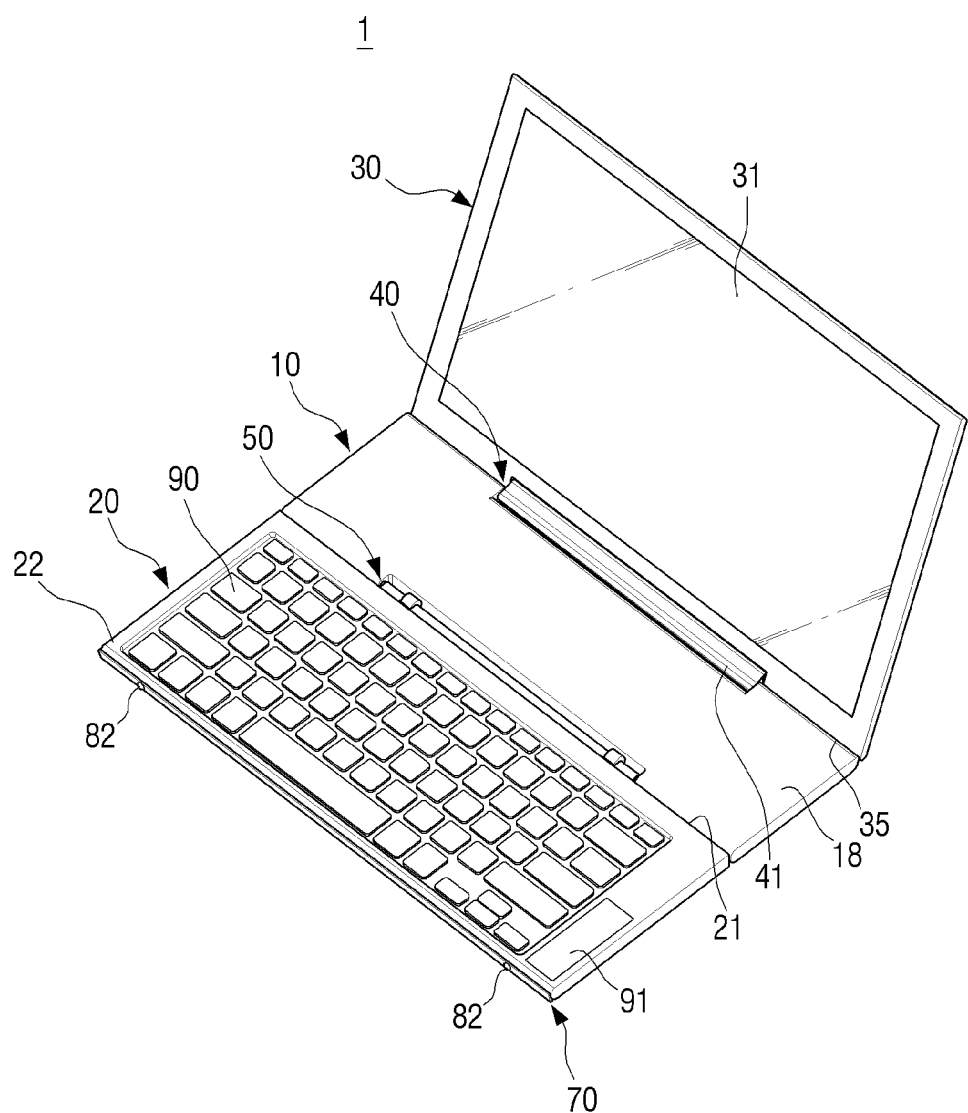
FIG. 1 is a perspective view illustrating a foldable computing apparatus according to an embodiment of the present disclosure.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 2:
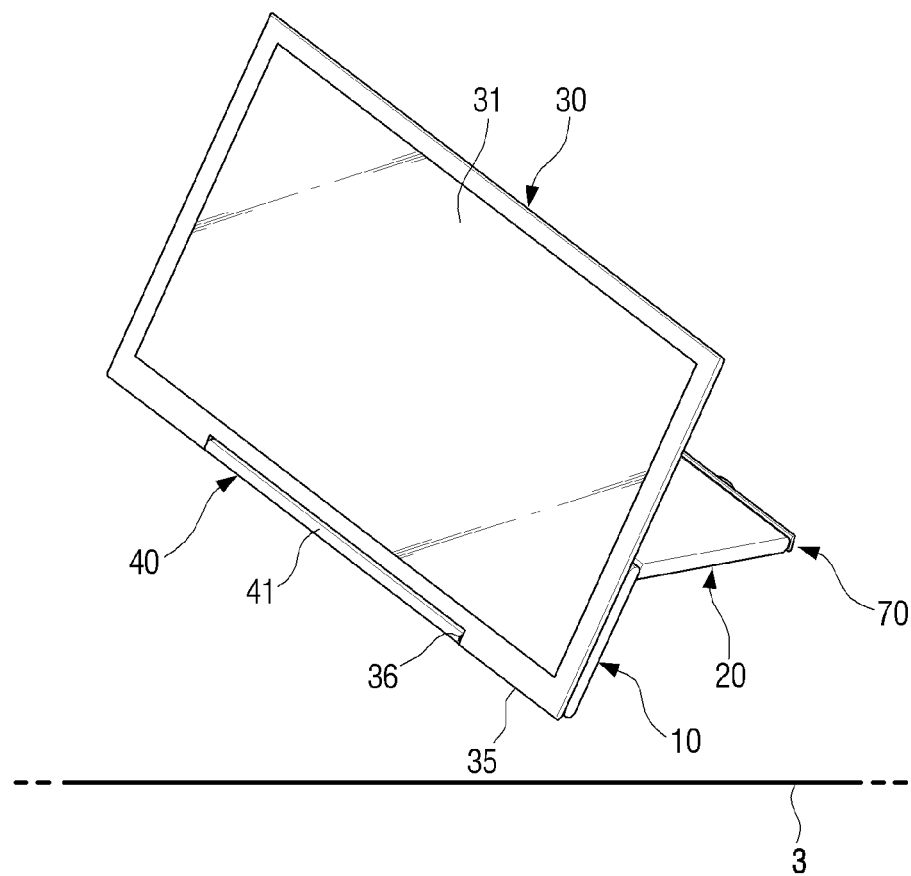
FIG. 2 is a perspective view illustrating a state of a touch mode of a foldable computing apparatus according to an embodiment of the present disclosure.
Figure 3:
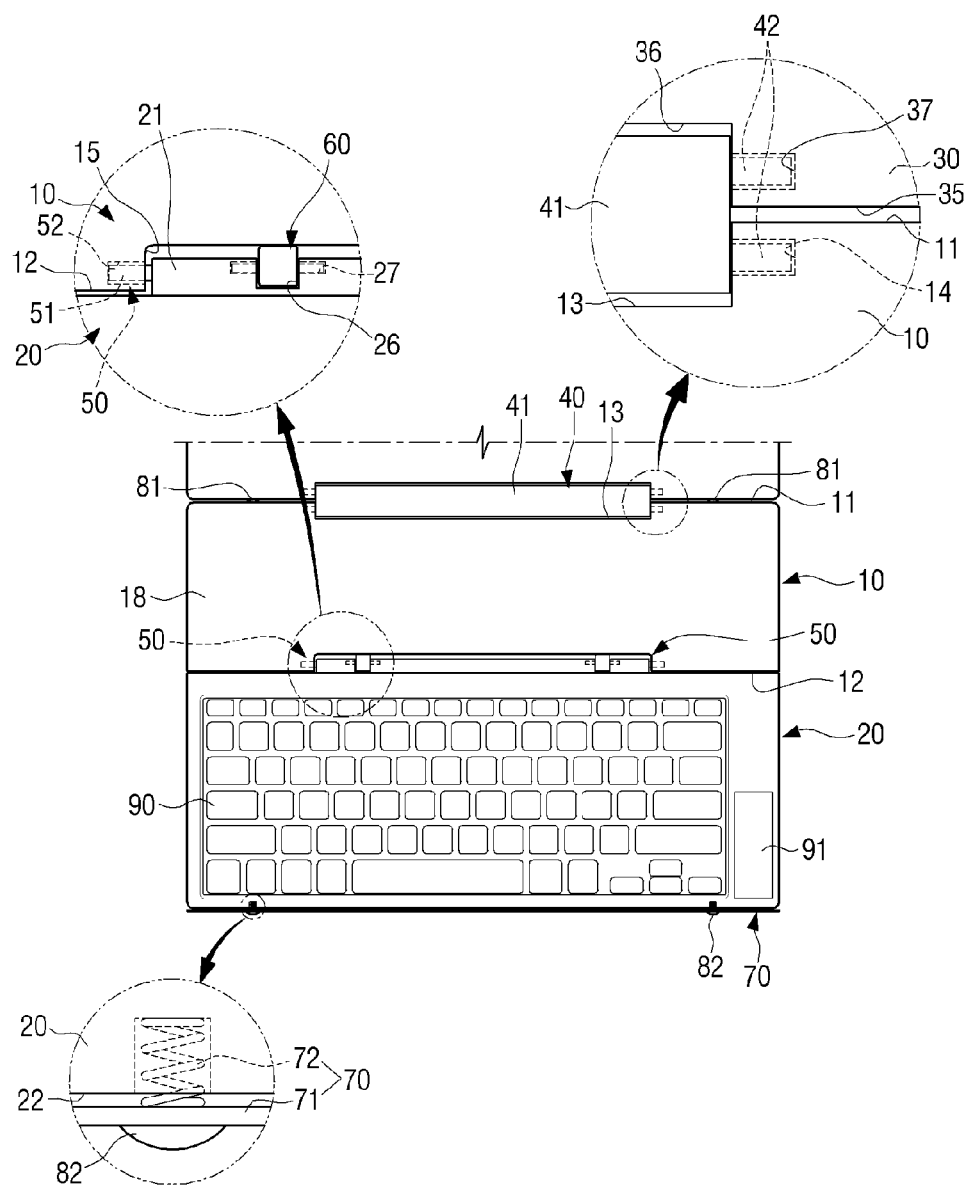
FIG. 3 is a plan view illustrating a main body of a foldable computing apparatus without a display unit thereof according to an embodiment of the present disclosure.

FIG. 1 is a perspective view illustrating a foldable computing apparatus 1 according to an embodiment of the present general inventive concept. FIG. 2 is a perspective view illustrating a state of a touch mode of the foldable computing apparatus 1 of FIG. 1 according to an embodiment of the present disclosure. FIG. 3 is a plan view illustrating a main body of the foldable computing apparatus 1 of FIG. 1 according to an embodiment of the present disclosure.

Referring to FIGS. 1, 2, and 3, the foldable computing apparatus 1 according to an embodiment of the present disclosure includes a first body 10, a second body 20, and a display unit 30.

The display unit 30 is formed in a substantially rectangular plate shape, and has a touch screen 31 provided on a front surface thereof. An attach member 34 (see FIG. 6) is disposed on a portion of a rear surface 32 (see FIG. 6) of the display unit 30 supported by a top end 21 (see FIG. 6) of the second body 20. The attach member 34 is formed of a magnetic material that can be attracted to a magnet. As another example, the entire rear surface 32 of the display unit 30 may be formed of the magnetic material instead of disposing the separate attach member 34 on the rear surface 32 of the display unit 30. The touch screen 31 displays one or more images, characters, etc. A user can operate the foldable computing apparatus 1 by touching the touch screen 31 with a user's hand.

The first body 10 and second body 20 configures a main body corresponding to the display unit 30. In other words, the main body having the first body 10 and second body 20 is formed in a shape similar to a shape of the display unit 30, and has the same size as that of the display unit 30. However, the present general inventive concept is not limited thereto. It is possible that a dimension of the main body may be different from a dimension of the display unit 30.

The first body 10 is rotatably connected to a bottom end 35 of the display unit 30. A first hinge unit 40 is disposed between the display unit 30 and the first body 10 to rotatably connect the first body 10 and the display unit 30. The first hinge unit 40 is configured such that the first body 10 can be rotated approximately 360 degrees with respect to the display unit 30. In other words, the first hinge unit 40 allows the first body 10 to be rotated from a state in which a front surface of the display unit 30 on which the touch screen 31 is disposed is in contact with or close to a top surface 18 of the first body 10 to a state in which a bottom surface 19 of the first body 10 is in contact with or close to the rear surface 32 of the display unit 30 (see FIG. 6).

For example, the first hinge unit 40 may include a hinge member 41. The hinge member 41 is formed in a substantially long rod shape, and two hinge shafts 42 are disposed on each of opposite ends of the hinge member 41. A first hinge groove 36 and a second hinge groove 13 in which the hinge member 41 can be disposed are formed in the bottom end 35 of the display unit 30 and the top end 11 of the first body 10, respectively.

A hinge hole 37 is formed in each of opposite side surfaces of the first hinge groove 36 formed in the display unit 30. Also, a hinge hole 14 is formed in each of opposite side surfaces of the second hinge groove 13 formed in the first body 10. The hinge holes 37 and 14 are formed so that the hinge shafts 42 of the hinge member 41 can be inserted and rotated in the hinge holes 37 and 14. Accordingly, the two hinge shafts 42 provided on the opposite ends of the hinge member 41 are inserted in the hinge holes 37 and 14 formed in the first hinge groove 36 and second hinge groove 13, respectively. As a result, the first body 10 can be rotated approximate 360 degrees with respect to the display unit 30 by the first hinge unit 40.

In the above description, it is described that the hinge shafts 42 are formed in the hinge member 41, and the hinge holes 37 and 14 are formed in the opposite side surfaces of each of the first hinge groove 36 and the second hinge groove 13. However, the present general inventive concept is not limited thereto. That is, it is possible that the hinge holes are formed in the hinge member 41, and the hinge shafts are formed in the opposite side surfaces of each of the first hinge groove 36 and the second hinge groove 13.

Further, the first hinge unit 40 may include a first fixing unit (not illustrated) that fixes the first body 10 not to be rotated in a state in which the first body 10 is rotated a certain angle with respect to the display unit 30. Accordingly, if the user applies a force to the first body 10, the first body 10 is rotated so that an angle between the display unit 30 and the first body 10 can be adjusted. If the user does not apply a force, the angle adjusted by rotation of the first body 10 is maintained. The first fixing unit can use a fixing unit that is the same as or similar to fixing units used in the hinge unit of conventional notebook computers, therefore, detailed description thereof will be omitted.

Referring to FIG. 3, first anti-slip members 81 may be disposed on both sides of the second hinge groove 13 in the top end 11 of the first body 10. The first anti-slip member 81 is disposed on the top end 11 of the first body 10 in contact with a reference surface, for example, a ground 3, to prevent the display unit 30 from sliding when the display unit 30 of the foldable computing apparatus 1 according to an embodiment of the present disclosure is erected on the ground 3 as illustrated in FIG. 2. Accordingly, the first anti-slip member 81 is formed of a material with a large friction coefficient. For example, the first anti-slip member 81 may be formed of a rubber. Here, the ground 3 refers to any flat place on which the display unit 30 of the foldable computing apparatus 1 according to an embodiment of the present disclosure can be erected such as a top surface of a desk, a room floor, a floor, etc. As illustrated in FIG. 3, one or more second anti-slip members 82 may be formed on the second body 20, and a cushion device 70 having a cushion plate 71 and an elastic member 72 may be formed on the second body 20.

A second hinge unit 50 is disposed between the first body 10 and the second body 20. The second hinge unit 50 allows the second body 20 to be rotated up to 180 degrees with respect to the first body 10. At this time, the second body 20 can be rotated upward to a state of FIG. 1 from a state in which the second body 20 is placed in the same plane as the first body 10 (see FIGS. 12 and 13).

For example, the second hinge unit 50 may include a hinge shaft 51 and a hinge hole 52. Referring to FIG. 3, a receiving groove 15 is provided in the bottom end 12 of the first body 10, and a projecting portion 21 inserted in the receiving groove 15 of the first body 10 is formed in the top end of the second body 20. A hinge shaft 51 is disposed in each of the opposite side surfaces of the projecting portion 21 of the second body 20. Also, a hinge hole 52 corresponding to the hinge shaft 51 of the projecting portion 21 of the second body 20 is formed in each of the opposite side surfaces of the receiving groove 15 of the first body 10. The hinge holes 52 are formed so that the hinge shafts 51 of the projecting portion 21 can be inserted and rotated in the hinge holes 52. FIG. 3 illustrates a case that the hinge holes 52 are formed in the receiving groove 15 of the first body 10, and the hinge shafts 51 are formed in the projecting portion 21 of the second body 20. However, the present general inventive concept is not limited thereto. That is, the hinge shafts may be formed in the receiving groove 15 of the first body 10, and the hinge holes may be formed in the projecting portion 21 of the second body 20.

Also, the second hinge unit 50 may include a second fixing unit (not illustrated) that fixes the second body 20 not to be rotated in a state in which the second body 20 is rotated a certain angle with respect to the first body 10. Accordingly, if the user applies a force to the second body 20, the second body 20 is rotated with respect to the first body 10 so that an angle θ1 between the first body 10 and the second body 20 can be adjusted. If the user does not apply a force, the angle adjusted by rotation of the second body 20 may be maintained. The second fixing unit may be a fixing unit that is the same as or similar to fixing units used in the hinge units of conventional notebook computers, therefore, a detailed description thereof will be omitted.

Further, a plurality of cushion members 60 may be disposed in an upper side of the projecting portion 21 of the second body 20. Accordingly, when the second body 20 is rotated a certain angle with respect to the first body 10, the plurality of cushion members 60 provided on the projecting portion 21 of the second body 20 projects. When the first body 10 and the second body 20 are placed on a same plane or are disposed substantially parallel to each other, the plurality of cushion members 60 does not project since the plurality of cushion members 60 are placed between the bottom end 12 of the first body 10 and the projecting portion 21 of the second body 20. When the display unit 30 of the foldable computing apparatus 1 is erected on the ground 3 as illustrated in FIG. 2, the plurality of cushion members 60 supports the display unit 30, and thus absorbs a force generated when the touch screen 31 of the display unit 30 is touched by a user to input data or command, select one of icons or menus, etc.

Figure 4:
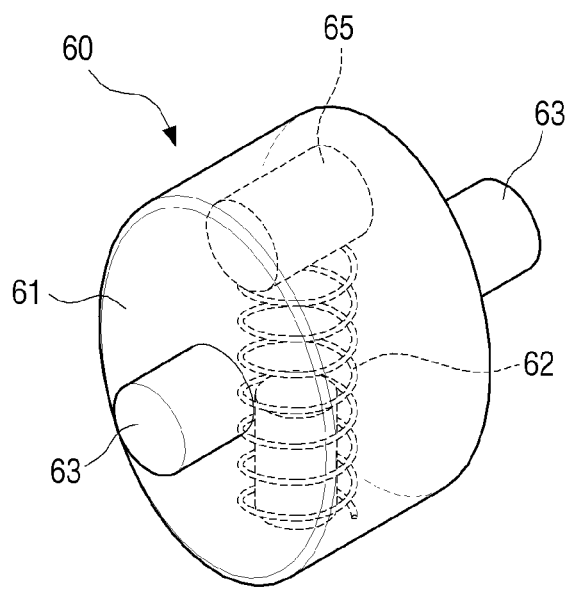
FIG. 4 is a perspective view illustrating a cushion member used in the foldable computing apparatus of FIG. 3.
Figure 5:
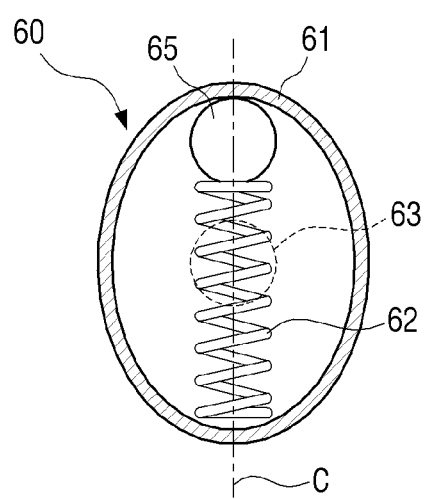
FIG. 5 is a side view illustrating the cushion member of FIG. 4.

FIGS. 4 and 5 illustrate an example of the cushion member 60. FIG. 4 is a perspective view illustrating the cushioning member 60 used in the foldable computing apparatus 1 according to an embodiment of the present disclosure, and FIG. 5 is a side view illustrating the cushion member of FIG. 4.

The cushion member 60 may include a housing 61 and a spring 62. The housing 61 is formed of an elastic material such as a rubber, and when receiving a force, the received force can be transformed or absorbed. The housing 61 may be formed in a roller shape with an approximate ellipse section as illustrated in FIGS. 4 and 5. As another example, even though not illustrated, the housing 61 may be formed in a roller shape with an approximate circular section.

A rotation shaft 63 is disposed on each of the opposite side surfaces of the housing 61. At least one cushion member mounting groove 26 in which the cushion member 60 is disposed is formed in the projecting portion 21 of the second body 20. In the present embodiment, since two cushion members 60 are used, the second body 20 has two cushion member mounting grooves 26. A rotation hole 27 in which the rotation shaft 63 of the cushion member 60 is inserted is formed in each of the opposite side surfaces of the cushion member mounting groove 26. Accordingly, when the rotation shaft 63 of the cushion member 60 is inserted in the rotation hole 27 of the cushion member mounting groove 26, the cushion member 60 can rotate about the rotation shaft 63.

Also, the spring 62 may be a coil spring and may be disposed inside the housing 61 to assist the elasticity of the housing 61. The coil spring 62 is disposed inside the housing 61 so that the coil spring 62 performs an expanding and contracting action in a long axis direction C of the housing 61 of an ellipse shape. In other words, the long-axis direction C of the housing 61 is formed to be aligned with an operation direction of the spring 62. Therefore, when a force is applied to one end of the long-axis direction C of the cushion member 60, both the housing 61 and the spring 62 can absorb the force, thereby buffering a shock corresponding to the force.

Also, a permanent magnet 65 is disposed near an end of the long-axis direction C of the housing 61 inside the housing 61. The permanent magnet 65 has a magnetic force that can rotate the cushion member 60 based on the rotation shaft 63 when the attach member 34 of the display unit 30 comes close to the permanent magnet 65. The permanent magnet 65 is disposed above the spring 62 disposed inside the housing 61 as illustrated in FIGS. 4 and 5. Accordingly, when the end of the long-axis direction C of the housing 61 is in contact with the attach member 34 of the display unit 30 by the permanent magnet 65, the force applied to the display unit 30 acts substantially parallel to the operation direction of the spring 62. In other words, the long-axis direction C of the housing 61 and the rear surface 32 of the display unit 30 become an approximately right angle by the attach member 34 of the display unit 30 and the permanent magnet 65 of the cushion member 60. Further, since the cushion member 60 is rotated based on the rotation shaft 63 by the magnetic force acting between the attach member 34 of the display unit 30 and the permanent magnet 65 of the cushion member 60, the long-axis direction C of the cushion member 60 maintains an approximately right angle to the rear surface 32 of the display unit 30 even when an angle θ1 between the first body 10 and the second body 20 is changed and an angle θ2 between the display unit 30 and the second body 20 is changed.

Hereinafter, an operation of the cushion member 60 that allows the long-axis direction C of the cushion member 60 to become approximately perpendicular to the rear surface 32 of the display unit 30, even when the angle θ1 between the second body 20 and the first body 10 is changed, will be described with reference to FIGS. 6, 7, and 8.

Figure 6:
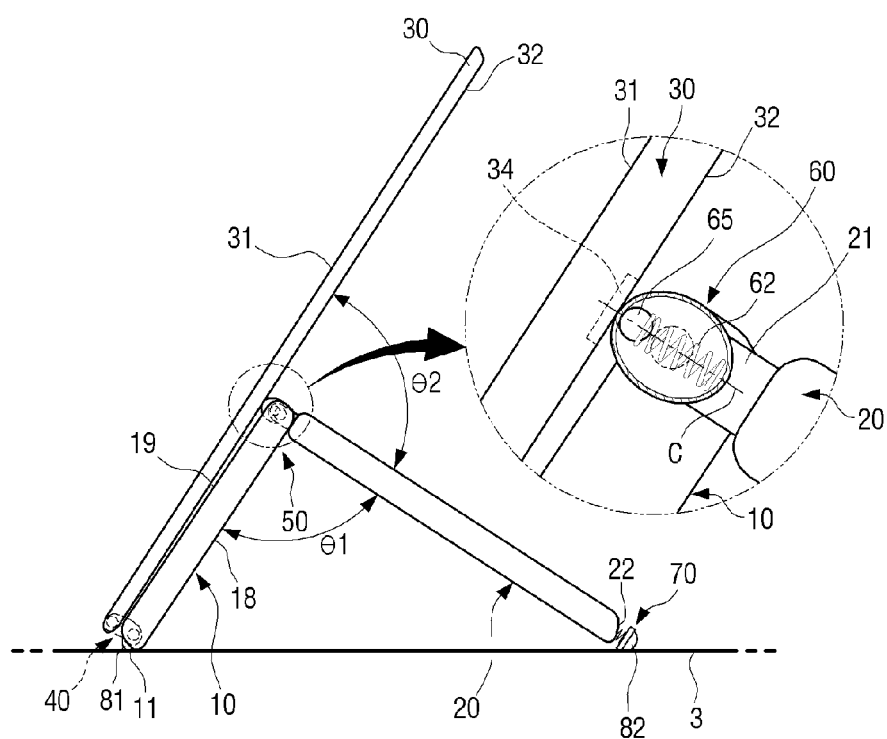
FIG. 6 is a side sectional view schematically illustrating a state of a touch mode of a foldable computing apparatus according to an embodiment of the present disclosure.

FIG. 6 is a side sectional view schematically illustrating a state of the foldable computing apparatus 1 of FIG. 1 in a touch mode according to an embodiment of the present disclosure. FIG. 7 is a side sectional view illustrating the foldable computing apparatus 1 when an angle between the display unit 30 and the ground 3 is larger than an angle between the display unit 30 of the foldable computing apparatus 1 and the ground 3 according to an embodiment of the present disclosure. FIG. 8 is a side sectional view illustrating the foldable computing apparatus 1 when an angle between the display unit 30 and the ground 3 is smaller than an angle between the display unit 30 of the foldable computing apparatus 1 and the ground 3 according to an embodiment of the present disclosure.

Referring to FIG. 6, the second body 20 supports the display unit 30 in a state which the second body 20 is at an approximately right angle to the first body 10. At this time, since the attach member 34 of the display unit 30 is made of a magnetic material, a magnetic force acts between the attach member 34 and the permanent magnet 65 of the cushion member 60 so that an end of the cushion member 60 in which the permanent magnet 65 is disposed becomes in contact with the attach member 34 of the display unit 30. Since the permanent magnet 65 is disposed in an end of the long-axis direction C of the cushion member 60, that is, above the spring 62 disposed inside the cushion member 60, the spring 62 of the cushion member 60 is positioned approximately perpendicular to the rear surface 32 of the display unit 30. Accordingly, when the user touches the display unit 30, the cushion member 60 can effectively absorb a force applied to the display unit 30. At this time, the long-axis direction C of the cushion member 60 becomes approximately parallel to the second body 20.

Figure 7:
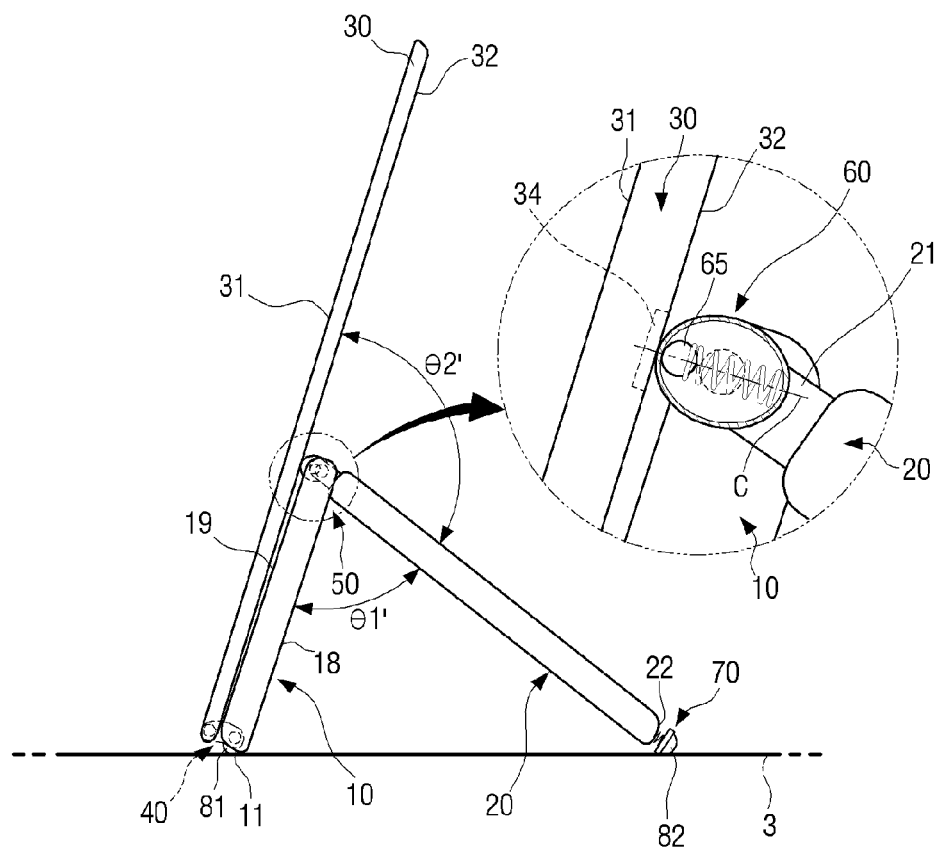
FIG. 7 is a side sectional view illustrating the foldable computing apparatus of FIG. 6 in a state when an angle between a display unit and the ground is larger than an angle between the display unit and a reference surface of the foldable computing apparatus according to an embodiment of the present disclosure.

FIG. 7 illustrates a case in which the display unit 30 is erected perpendicularly or at an angle larger than an angle of FIG. 6 on the ground 3. In this case, an angle θ1' between the first body 10 and the second body 20 is smaller than the angle θ1 between the first body 10 and the second body 20 of the foldable computing apparatus 1 as illustrated in FIG. 6. In other words, the angle θ1' between the first body 10 and the second body 20 forms an acute angle. Since the magnetic force also acts between the permanent magnet 65 of the cushion member 60 and the attach member 34 disposed in the rear surface 32 of the display unit 30 in this case, the long-axis direction C of the cushion member 60 becomes approximately perpendicular to the rear surface 32 of the display unit 30 as illustrated in FIG. 7. At this time, the long-axis direction C of the cushion member 60 is rotated in a counterclockwise direction with respect to a center thereof or the second body 20 to become, for example, parallel to the ground 3 or to form a certain angle with the second body 20.

In this case, the angle θ2 between the display device 30 and the second body 20 may be changed to an angle θ2'.

Figure 8:
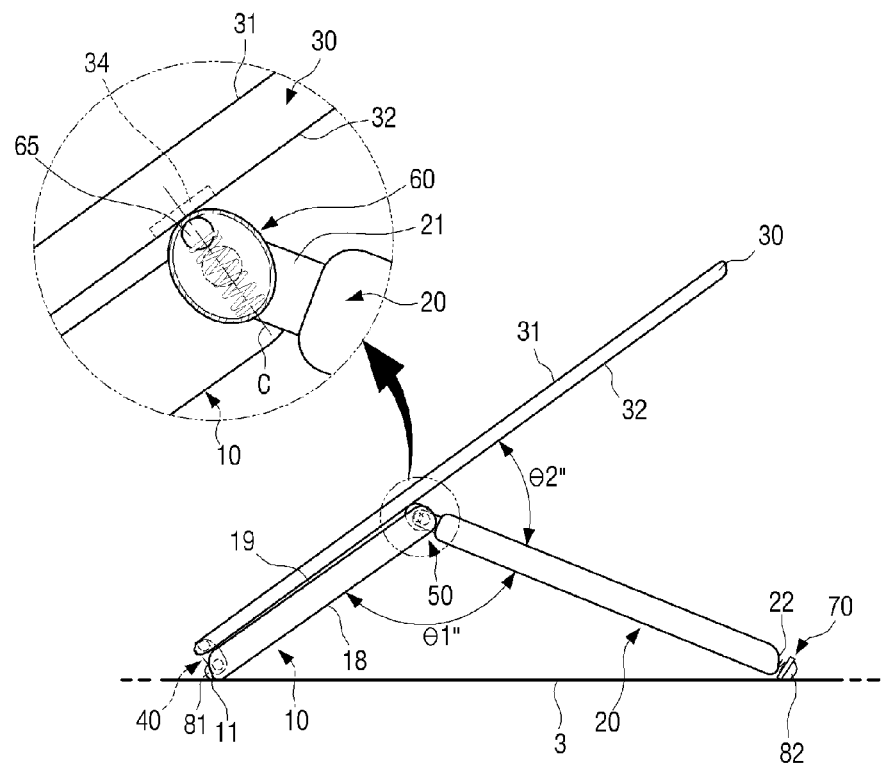
FIG. 8 is a side sectional view illustrating the foldable computing apparatus of FIG. 6 in a state when an angle between a display unit and the ground is smaller than an angle between the display unit and a reference surface of the foldable computing apparatus according to an embodiment of the present disclosure.

Also, FIG. 8 illustrates a case in which the display unit 30 is laid closer to the ground 3 than FIG. 6. In this case, the angle θ1" between the first body 10 and the second body 20 is larger than the angle θ1 between the first body 10 and the second body 20 of the foldable computing apparatus 1 as illustrated in FIG. 6. In other words, the angle θ1" between the first body 10 and the second body 20 forms an obtuse angle. Since the magnetic force also acts between the permanent magnet 65 of the cushion member 60 and the attach member 34 disposed in the rear surface 32 of the display unit 30 in this case, the long-axis direction C of the cushion member 60 becomes approximately perpendicular to the rear surface 32 of the display unit 30 as illustrated in FIG. 8. Accordingly, the cushion member 60 can effectively absorb the force applied to the display unit 30. At this time, the long-axis direction C of the cushion member 60 is rotated in a clockwise direction with respect to the center thereof or the second body 20 to become, for example, perpendicular to the ground 3 or to form a certain angle with the second body 20. In this case, the angle θ2' between the display device 30 and the second body 20 may be changed to an angle θ2".

Referring again to FIG. 3 and as described above, at least one cushion device 70 may be disposed in a bottom end 22 of the second body 20, namely, in a side surface of the second body 20 opposite to the projecting portion 21. The cushion device 70 plays a role in reducing the force applied to the second body 20 to support the force applied to the touch screen 31 when the display unit 30 is erected on the ground 3 as illustrated in FIG. 2.

The cushion device 70 includes a cushion plate 71 and a plurality of elastic members 72 disposed in a groove of the second body 20 and disposed to support the cushion plate 71. The cushion plate 71 may be formed in a flat plate having a size and shape corresponding to the bottom end 22 of the second body 20. The plurality of elastic members 72 is disposed on the bottom end 22 of the second body 20. The elastic member 72 has one end fixed to the bottom end 22 of the second body 20, and the other end fixed to the cushion plate 71. Accordingly, when the second body 20 is rotated a certain angle with respect to the display unit 30 and supports the display unit 30 as illustrated in FIG. 2, the cushion plate 71 of the cushion device 70 is in contact with the ground 3 so that the cushion device 70 can absorb the force applied to the display unit 30.

In the present embodiment, two elastic members 72 are used, and a coil spring is used as the elastic member 72. However, the present general inventive concept is not limited thereto. Three or more elastic members 72 may be used and leaf springs may be used as the elastic members 72.

Also described above, a plurality of second anti-slip members 82 may be disposed on the cushion plate 71. The second anti-slip members 82 are disposed on the cushion plate 71 in contact with the ground 3 when the display unit 30 of the foldable computing apparatus 1 is erected on the ground 3, and thus prevents the display unit 30 from sliding. In the present embodiment, two second anti-slip members 82 are spaced apart a certain distance, and are disposed on the cushion plate 71. However, the present general inventive concept is not limited thereto, and, if necessary, three or more second anti-slip members 82 may be disposed on the cushion plate 71. Also, the second anti-slip members 82 are formed of a material with a large friction coefficient in order to prevent sliding of the display unit 30. For example, the second anti-slip members 82 may be formed of a same or similar material, for example, a rubber, as or to the first anti-slip member 81.

As another embodiment, if the plurality of cushion members 60 disposed in the projecting portion 21 of the second body 20 can fully absorb the force applied to the touch screen 31, the cushion device 70 may not be disposed on the bottom end 22 of the second body 20. A foldable computing apparatus 1' with the second body 20 on which the cushion device 70 is not disposed is illustrated in FIG. 9.

Figure 9:
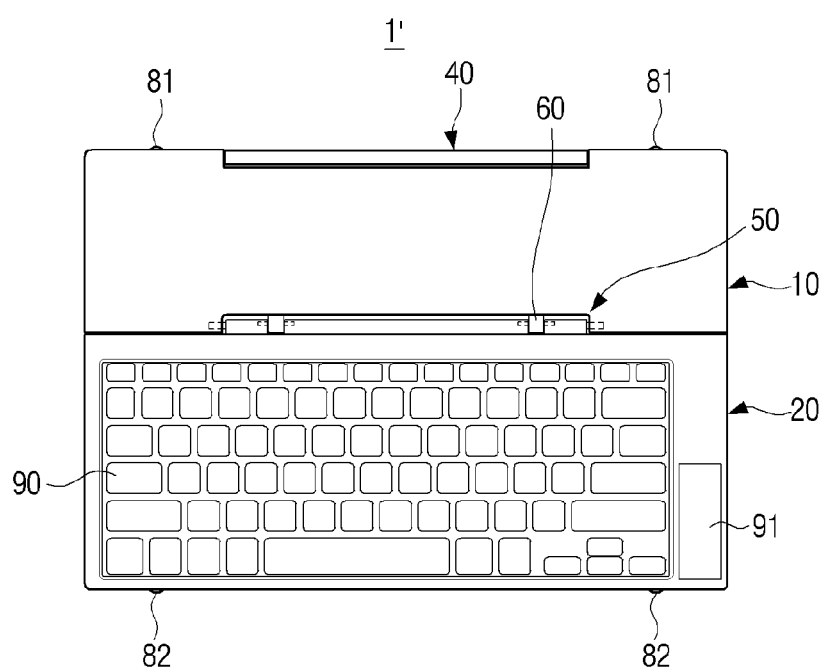
FIG. 9 is a plan view illustrating a foldable computing apparatus without a display unit according to an embodiment of the present disclosure.

Referring to FIG. 9, the second anti-slip members 82 are disposed on the bottom end 22 of the second body 20, that is, on a side surface opposite to the side surface of the second body 20 in which the projecting portion 21 is formed. Accordingly, when the display unit 30 of the foldable computing apparatus 1 according to an embodiment of the present disclosure is erected on the ground 3 as illustrated in FIG. 2, the second anti-slip members 82 disposed on the bottom end 22 of the second body 20 are in contact with the ground 3, and thus may prevent the display unit 30 from sliding. An installation location of the second anti-slip members 82 as illustrated in FIG. 9 may be different from that of the second anti-slip members 82 of FIG. 3, but the other things are the same. Therefore, detailed descriptions thereof will be omitted. It is possible that the second anti slip member 82 may be directly disposed on the second body 20 without the cushion device 70. In this case, the second anti slip member 82 is formed with an elastic material to absorb the force applied to the display device 30 or the foldable computing apparatus 1. It is also possible that the second anti slip member 82 may be disposed in a groove of the second body 20 to protrude from an end portion of the groove of the second body 20 to contact the ground 3.

A variety of parts that allows the foldable computing apparatus 1 to perform various functions may be disposed inside the first body 10 and the second body 20. In other words, printed circuit boards to configure a power unit, a calculation unit, a storage unit, and an interface unit may be properly disposed inside the first body 10 and the second body 20.

Figure 10:
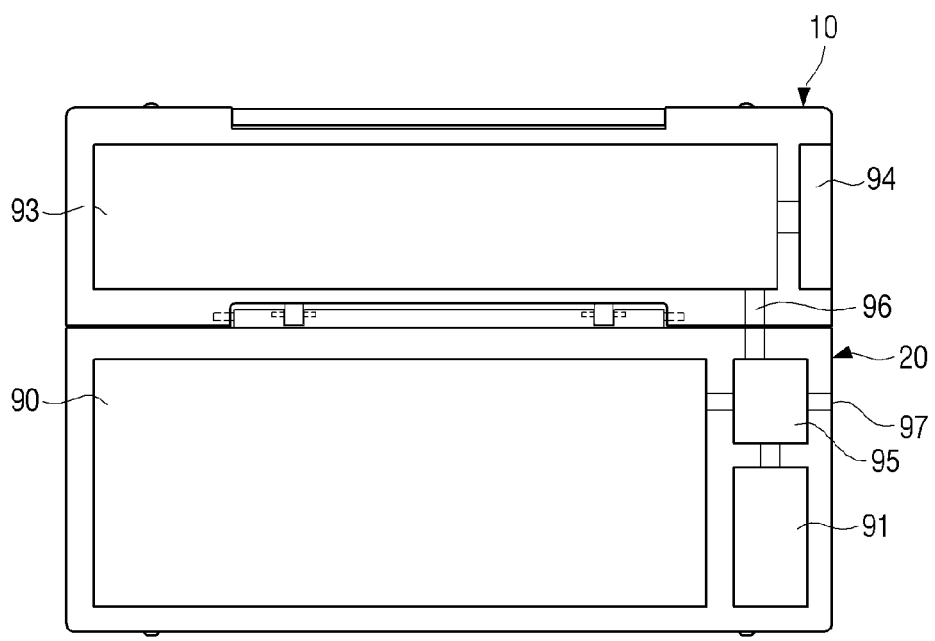
FIG. 10 is a layout view illustrating an example of a layout of circuit boards disposed inside a first body and a second body of a foldable computing apparatus according to an embodiment of the present disclosure.

FIG. 10 is a layout view or block diagram illustrating an example of a layout of circuit boards disposed inside the first body 10 and the second body 20 of the foldable computing apparatus 1 according to an embodiment of the present disclosure.

Referring to FIG. 10, a main board 93 and an interface board 94 are disposed inside the first body 10, and a keyboard 90, a touch pad 91, and a sub board 95 are disposed inside the second body 95. At least a portion of the keyboard 90, the touch pad 91, and/or the sub board 95 may be exposed from a housing of the second body 95. It is also possible that at least a portion of the main board 93 and/or the interface board 94 may be exposed from a housing of the first body 10.

The main board 93 is formed of a printed circuit board including CPUs, RAMs, ROMs, etc., and includes a calculation unit to allow the foldable computing apparatus 1 according to an embodiment of the present disclosure to perform a variety of functions. Accordingly, the main board 93 receives commands or data from input units such as the keyboard 90, the touch screen 31, etc., processes the received commands or data, and displays the result on the touch screen 31 of the display unit 30, stores the result in a storage unit (not illustrated), or outputs the result to an outside thereof. The interface board 94 may be connected to the main board 93. Although not illustrated, the storage unit may be connected to the main board 93. As other example, the interface board 94 and the storage unit may be formed integrally with the main board 93. The main board 93 may use a main board that is the same as or similar to main boards used in conventional notebook computers, therefore, a detailed description thereof will be omitted.

The storage unit (not illustrated) stores programs required to operate the foldable computing apparatus 1, and data such as user-created documents, images, photos, videos, etc. The storage unit may use storage apparatuses such as memories, hard disks, etc. Therefore, a detailed description thereof will be omitted.

The interface board 94 is to connect external peripheral apparatuses and the foldable computing apparatus 1 according to an embodiment of the present disclosure, and may include at least one USB port, sound input/output terminals, video input/output terminals, power terminals, etc. The interface board 94 may be configured in a way that is the same as or similar to interface boards used in conventional notebook computers, therefore, a detailed description thereof will be omitted.

The power unit (not illustrated) is to supply the power to the main board 93, the storage unit (not illustrated), and the display unit 30 configuring the foldable computing apparatus 1, and may use various power supply apparatuses. For example, a rechargeable battery may be used as the power unit. Also, the power unit may be formed to receive electricity from a commercial electric power source and to supply the electricity to other parts. The power unit may be disposed below the main board 93 of the first body 10 or below the keyboard 90 of the second body 20. The power unit may use a power unit that is the same as or similar to power units used in the conventional notebook computers. Therefore, a detailed description thereof will be omitted.

The keyboard 90 is disposed on a top surface of the second body 20. The keyboard 90 is an input device that can input characters, symbols, etc. into the foldable computing apparatus 1 according to an embodiment of the present disclosure.

Also, the touch pad 91 may be disposed on the top surface of the second body 20 with the keyboard 90. Since the second body 20 has an area smaller than that of a main body of the conventional notebook computer, a space in which both the keyboard 90 and the touch pad 91 are disposed is small. Accordingly, the touch pad 91 having a size smaller than a touch pad of the conventional notebook computer is used. Alternatively, a tack ball may be used instead of the touch pad 91.

Further, at least one USB port 97 may be disposed in the second body 20. A sub board 95 to connect the keyboard 90, the touch pad 91, and the USB port 97 may be disposed inside the second body 20. The sub board 95 may be connected to the main board 93 disposed inside the first body 10 through a flexible cable 96. The first body 10 may include an auxiliary key board connectable to the main board 93 as an input unit in addition to the keyboard 90 of the second body 20 to control a function of the foldable computing apparatus 1. It is also possible that the first body 10 may include an auxiliary display screen connectable to the main board 93 in addition to the screen of the display unit to display an image corresponding to a function of the foldable computing apparatus 1. However, the present general inventive concept is not limited thereto. The first body 10 may have an area smaller than an area of the second body 20. The display device 30 may have an area same as or similar to a sum of areas of the first body 10 and the second body 20.

Hereinafter, a method of erecting the display unit 30 of the foldable computing apparatus 1 according to an embodiment of the present disclosure with a structure as described above will be described with reference to FIGS. 1, 2, 11, 12, 13, and 14.

The foldable computing apparatus 1 according to an embodiment of the present disclosure may be used in two modes. In other words, there are a keyboard mode in which the foldable computing apparatus 1 according to an embodiment of the present disclosure may be used in the same way as that of a conventional notebook computer as illustrated in FIG. 1, and a touch mode in which the foldable computing apparatus 1 may be controlled by use of the touch screen 31 as illustrated in FIG. 2.

In the keyboard mode, as illustrated in FIG. 1, the first body 10 and the second body 20 are placed on the same plane, and the display unit 30 is rotated by the first hinge unit 40, and thus remains open a certain angle with respect to the first body 10. Accordingly, the user can input data or control the foldable computing apparatus 1 by using the keyboard 90. However, since the display unit 30 is supported only by the first hinge unit 40, when the touch screen 31 is touched, the display unit 30 is not stably supported.

Accordingly, if the user wants to use mainly the touch screen 31, the user switches it to the touch mode in which the display unit 30 of the foldable computing apparatus 1 is erected and supported by the first body 10 and the second body 20 as illustrated in FIG. 2.

A method of erecting and supporting the display unit 30 of the foldable computing apparatus 1 according to an embodiment of the present disclosure by the first body 10 and the second body 20 as follows.

Figure 11:
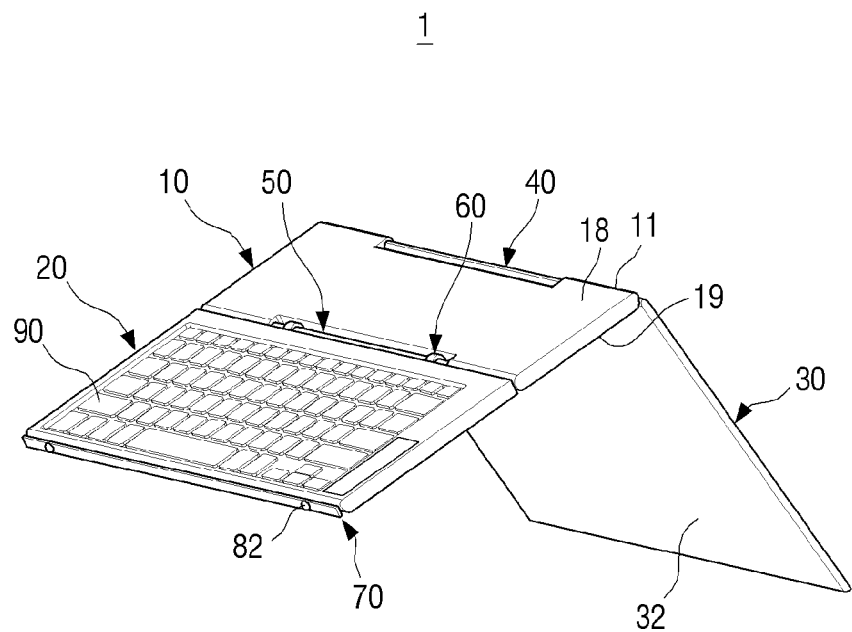
FIG. 11 is a perspective view illustrating a foldable computing apparatus in a state when a first body is being rotated toward a rear surface of a display unit according to an embodiment of the present disclosure.

The user rotates the first body 10 of the foldable computing apparatus 1 used in the keyboard mode with respect to the display unit 30. Alternatively, in a state in which the display unit 30 covers the first body 10 and the second body 20, that is, the touch screen 31 of the display unit 30 and the keyboard 90 of the second body 20 are close to face each other, the user rotates the first body 10 with respect to the display unit 30 in order for the first body 10 to move away from the touch screen 31. In other words, as illustrated in FIG. 11, the first body 10 and the second body 20 are rotated in a direction opposite to the touch screen 31 of the display unit 30. At this time, since the first hinge unit 40 is disposed between the first body 10 and the display unit 30, the first body 10 may be rotated approximate 360 degrees with respect to the display unit 30.

Figure 12:
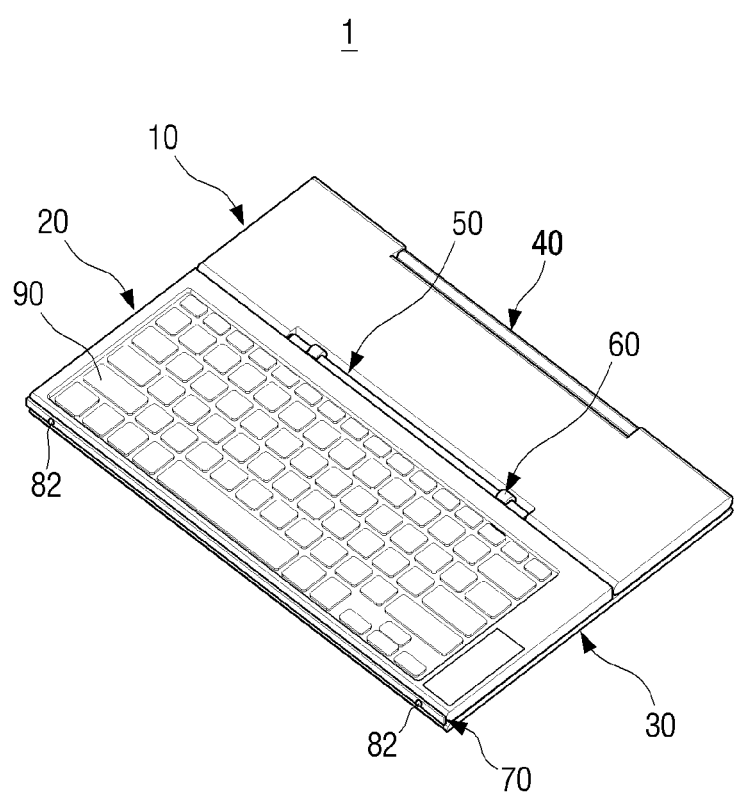
FIG. 12 is a perspective view illustrating a foldable computing apparatus in a state when a first body is maximally rotated toward a rear surface of a display unit according to an embodiment of the present disclosure.

After the first body 10 and the second body 20 are completely rotated with respect to the display unit 30, as illustrated in FIG. 12, a rear surface 19 of the first body 10 and a rear surface of the second body 20 are in contact with or close to a rear surface 32 of the display unit 30. As a result, in the foldable computing apparatus 1 as illustrated in FIG. 12, the keyboard 90 is exposed upwardly, and the touch screen 31 of the display unit 30 is exposed downwardly. At this time, the first anti-slip members 81 disposed on the top end 11 of the first body 10 are exposed.

Figure 13:
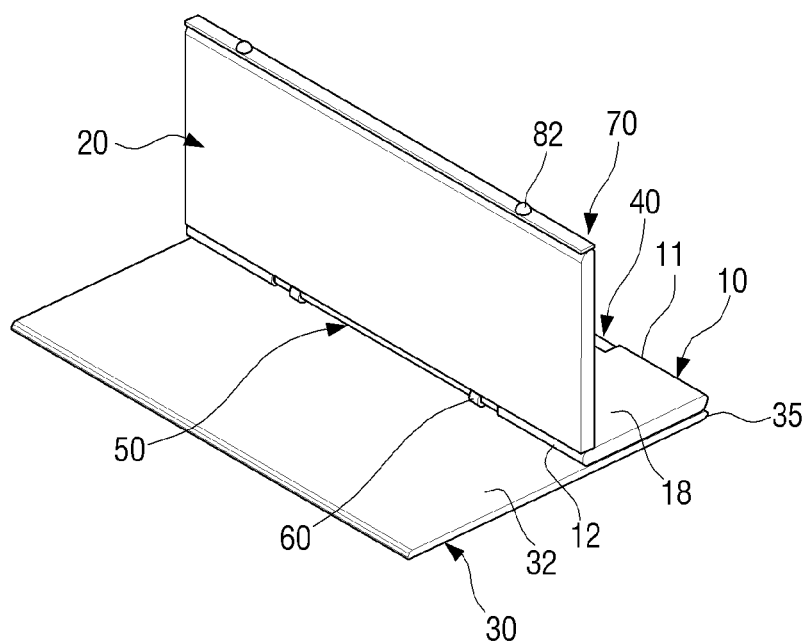
FIG. 13 is a perspective view illustrating a foldable computing apparatus of FIG. 12 in a state when a second body is rotated a certain angle with respect to a first body from a state of FIG. 12 according to an embodiment of the present disclosure.
Figure 14:
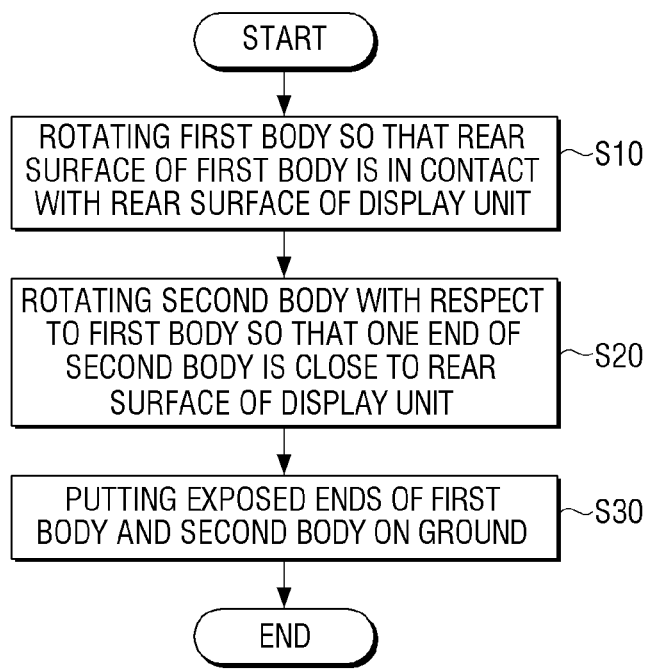
FIG. 14 is a flowchart illustrating a method of erecting a display unit of a foldable computing apparatus according to an embodiment of the present disclosure.

In this state, the user rotates the second body 20 with respect to the first body 10 as illustrated in FIG. 13. After the second body 20 is rotated approximate 90 degrees with respect to the first body 10, the top end 11 of the first body 10 and the bottom end 22 of the second body 20 are put on the ground 3 so that the display unit 30 is erected on the ground 3 as illustrated in FIG. 2.

When the second body 20 is rotated with respect to the first body 10, the cushion members 60 disposed on the projecting portion 21 of the second body 20 are exposed to support the rear surface 32 of the display unit 30. At this time, since the magnetic force acts between the permanent magnet 65 disposed in an end of the cushion member 60 and the attach member 34 of the rear surface 32 of the display unit 30, a shock-absorbing direction of the cushion member 60, that is, the long-axis direction C of the cushion member 60 becomes approximately perpendicular to the rear surface 32 of the display unit 30. Also, since the cushion device 70 and the second anti-slip members 82 are disposed in the bottom end 22 of the second body 20 contact with the ground 3 and the first anti-slip member 81 is disposed in the top end 11 of the first body 10, the first body 10 and the second body 20 may stably support the display unit 30.

In this state, the user touches the touch screen 31 of the display unit 30, thereby controlling the foldable computing apparatus 1. At this time, the force applied when the user touches the touch screen 31 with the user's hand is supported by second body 20, and thus the user can stably touch the touch screen 31.

Since a plurality of cushion members 60 is disposed between the rear surface 32 of the display unit 30 and the top end of the second body 20, the foldable computing apparatus 1 according to an embodiment of the present disclosure can effectively absorb the force applied when touching. Accordingly, the user may stably perform a touch operation to perform a function of the foldable computing apparatus 1.

Also, since the plurality of anti-slip members 81 and 82 are disposed on the top end 11 of the first body 10 and the bottom end 22 of the second body 20 contact with the ground 3, when the touch screen 31 is touched, the foldable computing apparatus 1 according to an embodiment of the present disclosure may be prevented from sliding on the ground 3.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A foldable computing apparatus comprising:
   a display unit having a touch screen;
   a first body rotatably disposed in an end of the display unit;
   a second body rotatably disposed in an end of the first body opposite to the display unit, the second body having a keyboard; and
   at least one cushion member disposed in another end of the second body close to the first body, an end of the least one cushion member is movable toward a rear surface of the display unit regardless of a rotation angle of the second body with respect to the first body;
   wherein the first body is rotated such that the rear surface of the display unit and a rear surface of the first body are close to each other, and then the second body is rotated with respect to the first body so as to support the display unit.

2. The foldable computing apparatus of claim 1, further comprising:
   at least one first anti-slip member disposed in the other end of the first body close to the display unit.

3. The foldable computing apparatus of claim 2, further comprising:
   at least one second anti-slip member disposed in an end of the second body that is opposite to the first body and will be in contact with a reference surface.

4. The foldable computing apparatus of claim 1, further comprising:
   at least one second anti-slip member disposed in an end of the second body that is opposite to the first body and will be in contact with a reference surface.

5. The foldable computing apparatus of claim 1, wherein the at least one cushion member comprises:
   a housing formed of a rubber; and
   a spring disposed inside the housing.

6. The foldable computing apparatus of claim 5, wherein the at least one cushion member further includes a magnet disposed above the spring inside the housing; and
   a magnetic material to which the magnet is attracted is disposed in the rear surface of the display unit.

7. The foldable computing apparatus of claim 1, further comprising:
   a first hinge unit disposed between the display unit and the first body; and
   a second hinge unit disposed between the first body and the second body.

8. The foldable computing apparatus of claim 7, wherein the first hinge unit allows the first body to be rotated 360 degrees with respect to the display unit; and
   the second hinge unit allows the second body to be rotated 180 degrees with respect to the first body.

9. The foldable computing apparatus of claim 1, further comprising:
   a cushion device disposed in an end of the second body that is opposite to the first body and will be in contact with a reference surface.

10. The foldable computing apparatus of claim 9, wherein at least one second anti-slip member is disposed in the cushion device.

11. The foldable computing apparatus of claim 9, wherein the cushion device comprises:
    a plurality of elastic members disposed in an end of the second body; and
    a cushion plate supported by the plurality of elastic members.

12. The foldable computing apparatus of claim 1, wherein the first body comprises a main board.

13. The foldable computing apparatus of claim 1, wherein the second body comprises a touch pad and at least one USB port.

14. A method of erecting a display unit of a foldable computing apparatus that comprises the display unit, a first body, a second body, and at least one cushion member, the method of erecting the display unit comprising:
    rotating the first body with respect to the display unit such that a rear surface of the first body is close to a rear surface of the display unit on which a touch screen is not disposed;
    rotating the second body with respect to the first body such that an end of the second body is close to the rear surface of the display unit; and
    putting an exposed end of the first body and the other end of the second body on a reference surface,
    wherein at least one cushion member is disposed in the end of the second body close to the first body; and
    an end of the at least one cushion member is movable toward the rear surface of the display unit regardless of a rotation angle of the second body with respect to the first body.

15. The method of erecting a display unit of claim 14, wherein when the first body is rotated with respect to the display unit, at least one first anti-slip member disposed in an end of the first body close to the display unit is exposed.

16. A foldable computing apparatus comprising:
    a display unit having a touch screen;
    a first body having a first end to be coupled to the display unit and to be rotatable with respect to the display unit in a range of a first maximum angle;

a second body rotatably coupled to a second end of the first body opposite to the display unit and to be rotatable with respect to the first body in a range of a second maximum angle smaller than the first maximum angle, the second body having a keyboard; and at least one cushion member disposed in another end of the second body close to the first body, an end of the at least one cushion member is movable toward a rear surface of the display unit regardless of a rotation angle of the second body with respect to the first body.

17. The foldable computing apparatus of claim 16, further comprising:

a first hinge unit having a first shaft connected to the display unit and a second shaft connected to the first body; and a second hinge unit having a single shaft connected between the first body and the second body.

18. The foldable computing apparatus of claim 16, further comprising:

a cushion member movably disposed on the second body to contact the rear surface of the display unit opposite to the touch screen in a touch mode.

19. The foldable computing apparatus of claim 16, further comprising:

an anti-slip member disposed on at least one of the first body and the second body to contact a reference surface in a touch mode.

* * * * *